United States Patent [19]

Elkayam

[11] Patent Number: 4,782,974

[45] Date of Patent: Nov. 8, 1988

[54] OIL TANK SAFETY CAP ADAPTER AND METHOD OF APPLICATION BY RETROFITTING

[76] Inventor: Raphael Elkayam, 14534 SW. 76th St., Miami, Fla. 33183

[21] Appl. No.: 132,879

[22] Filed: Dec. 14, 1987

[51] Int. Cl.⁴ .............................................. B67D 5/04
[52] U.S. Cl. ................................. 220/86 R; 220/85 F; 141/285
[58] Field of Search ................... 220/85 F, 86 R, 1 V, 220/85 V, 85 VR, DIG. 33; 141/285

[56] References Cited

U.S. PATENT DOCUMENTS

| 4,467,937 | 8/1984 | Shaw | 220/86 R |
| 4,696,330 | 9/1987 | Raudman et al. | 220/85 F |
| 4,702,386 | 10/1987 | Boehmer et al. | 220/86 R |

*Primary Examiner*—George T. Hall
*Attorney, Agent, or Firm*—Robert M. Schwartz; Edward I. Mates

[57] ABSTRACT

A method and apparatus for converting a fluid storage tank susceptible of leakage when a closure cap is improperly applied to a filler spout for said tank. The method comprises replacing the closure cap with an adapter constructed and arranged with securing means sufficiently identical to securing means provided on said closure cap to interfit with securing means provided on said closure spout. The adapter has a one-way valve at the inner end of an adapter pipe, and an enlarged collar beyond the outer end of said adapter pipe that interfits with the filler spout in a manner in which said closure cap previously interfit therewith. The enlarged collar has securing means sufficiently similar to securing means on said closure spout to secure said closure cap to said enlarged collar to prevent entry of debris into said adapter when said adapter has been fixed to said filler spout.

12 Claims, 3 Drawing Sheets

FIG - 1 -

OIL TANK SAFETY CAP ADAPTER AND METHOD OF APPLICATION BY RETROFITTING

BACKGROUND OF THE INVENTION

1. Field of the Invention

This invention relates to the prevention of loss of fluid from a container to which a closure cap is improperly applied or not applied at all, and preferably is used in conjunction with pressurized oil tanks of engines for jet aircraft. More particularly, this invention relates to a simple method and apparatus for converting a container that is subject to loss of fluid when a closure cap is either missing or misapplied to a filler spout into a container that is essentially free of spillage even when its closure cap is missing.

2. Technical Problems and the Prior Art

During flight, loss of oil has been a vexing problem for jet engines. One of the main reasons for this oil loss is the failure to close the closure cap for an oil tank properly after the tank has been filled with oil in preparation for a flight. The extent of oil loss is increased because most jet engines for aircraft use pressurized oil tanks. If loss of oil due to failure to close the oil tank properly is sufficient, it may require early termination of a flight to the annoyance of passengers. While other sources of oil loss exist, the one most susceptible of correction is the inadvertent carelessness of ground crew personnel to close the closure cap properly.

Several patents have been issued directed to containers having structure constructed and arranged to solve the aforesaid problem. However, most aircraft presently in service are provided with containers that are subject to leakage or spillage when the closure caps are improperly closed. It is an expensive and impractical undertaking to replace a container subject to loss of fluid when its closure cap is improperly closed by substituting one provided with means to prevent spillage or leakage even when uncapped. Prior to this invention, aircraft provided with prior art closure cap structures that require tight closing of the closure caps after filling have still been subject to the problem of spillage unless they were subjected to the large cost of replacing or rebuilding such storage tanks.

U.S. Pat. No. 173,452 to Donovan (1876) and 198,501 to Volkman (1877) disclose gravity activated, one-way flap valves for use in stench traps for toilets. The flap valves open when the toilet is flushed and close by gravity to seal off upward flow of noxious gases.

British Pat. No. 365,960 to Sansom, et al (1931) discloses a valve 7 that is spaced inwardly from the outer end of a filler spout 4 for a motor vehicle. The valve is spring loaded to open when a fluid dispensing nozzle is inserted through the valve opening at the inner end of the filer spout and to move upwardly to close the valve opening when the fluid dispensing nozzle is withdrawn.

U.S. Pat. No. 3,903,943 to Vest (1975) provides a supply tank with a self-closing adapter 21 that is forced open at its inner end by insertion of a fuel dispensing nozzle 14 therethrough and withdrawal of nozzle 14 allows adapter 21 to close in inwardly spaced relation to the entrance of filler spout 11. The latter is normally sealed by a closure cap 19. The self-closing adapter 21 prevents spillage from the supply tank even without a properly applied closure cap.

U.S. Pat. No. 4,135,562 to Martineau, et al. (1979) discloses a filling and venting device for a fuel tank. The device has a valve 16 that is spring loaded to be closed in spaced relation to the opening of the device. A closure cap 6 closes the opening. Whenever inward flow of fuel is stopped, valve 16 prevents outward flow of fuel even if closure cap 6 is not applied.

U.S. Pat. No. 4,501,374 to Robertson (1985) discloses a hazardous fluids tank having a check valve which includes a grommet 16 and a flap check valve 18. The latter extends inwardly into the tank interior to prevent reverse flow of the fluids out of the tank in case its filler pipe 20 or closure cap 21 is removed.

SUMMARY OF THE INVENTION

This invention provides a device comprising an adapter having an adapter pipe constructed and arranged to be inserted within a filler spout of a fluid container, a one-way valve at the inner end portion of the adapter pipe and an enlarged collar integral with or fixed to the outer end of said adapter pipe. The adapter pipe is constructed and arranged with securing means sufficiently identical to the securing means of a closure cap so that the enlarged collar may be secured to the filler spout by pressure and rotary movement in a manner similar to the closure cap. The device can thus be retrofit into the position normally occupied by the closure cap to permit inward flow of fuel or other fluid through an opening provided by the one-way valve when fluid is poured into said device to flow said fluid by gravity into the tank and to enable said one-way valve to close in spaced relation to the outer end of the filler spout when said inward fluid flow stops to prevent leakage or spillage of said fluid even when a closure cap is not applied to the filler spout.

In a preferred embodiment of this invention, the one-way valve is constructed and arranged to be supported in a pivotally adjustable orientation so as to close automatically by gravity and surface tension when said fluid flow stops. Means either fixed to or integral with said adapter is provided to lock the angular orientation of the adapter pipe in proper alignment relative to the filler spout to insure automatic closure of the one-way valve by gravity. In addition, the outer end of said enlarged collar is constructed and arranged with cooperating securing means sufficiently identical to the cooperating securing means of the outer end of said filler spout to enable said closure cap to be secured to said enlarged collar by rotary motion of the closure cap securing means relative to the cooperating securing means provided on said collar.

The method aspect of this invention involves the removal of the closure cap from the outer end of said filler spout by rotary motion and the securing of the adapter pipe inwardly of the inner end of said enlarged collar to the outer end of said filler spout by rotary motion to retrofit the device in a desired arrangement relative to said filler spout. If desired, said closure cap may then be secured to the outer end of said enlarged collar after the container is filled. While securing the closure cap to the enlarged collar is not needed to prevent spillage or leakage, its reapplication to the collar provides a redundant safety feature and also prevents debris from entering the adapter.

Further details of this invention may be obtained from a study of a description of a preferred embodiment that follows.

BRIEF DESCRIPTION OF THE DRAWINGS

In the drawings that form part of the description of the preferred embodiment and wherein like reference numbers refer to like structural elements.

DESCRIPTION OF PREFERRED EMBODIMENT

Figure 1:
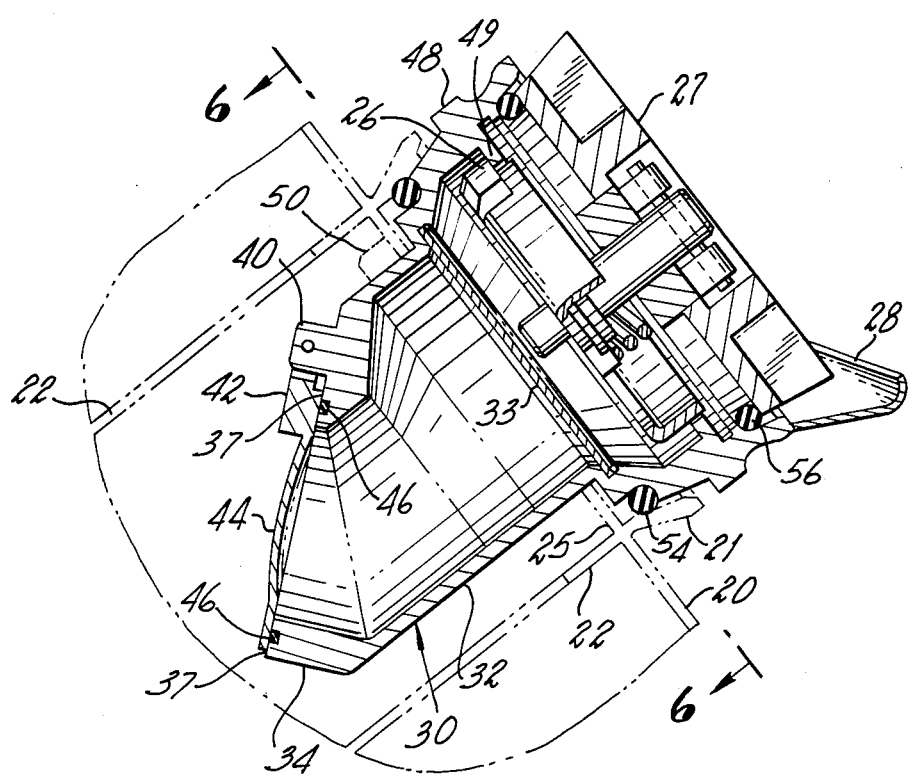
FIG. 1 is a longitudinal sectional view, partly in elevation, of a device that has been retrofitted into a filler spout of an oil tank according to this invention with special emphasis on the relation of an adapter to a conventional filler spout.
Figure 2:
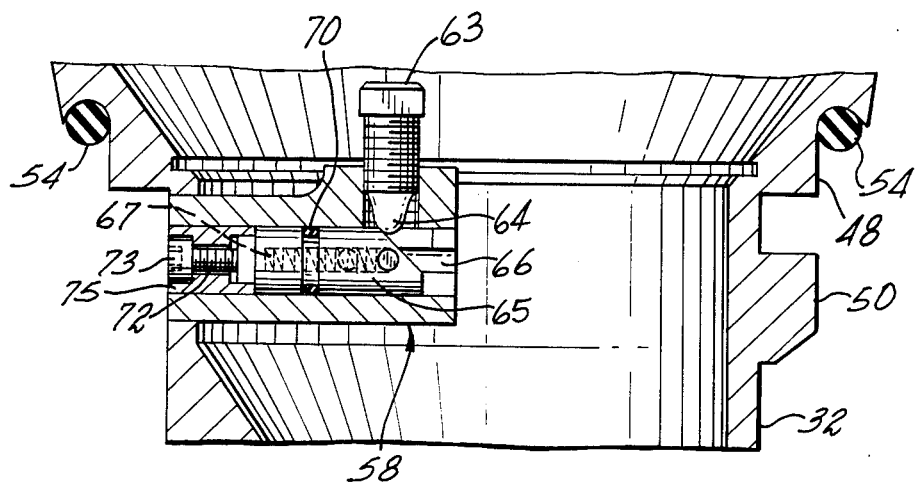
FIG. 2 is an enlarged fragmentary sectional view of a portion of FIG. 1 of the adapter taken on an oblique line to that of FIG. 1, with special emphasis on a locking device for locking said adapter to said filler spout. Said locking device having an extension member recessed to insert said adapter within said filler spout.
Figure 3:
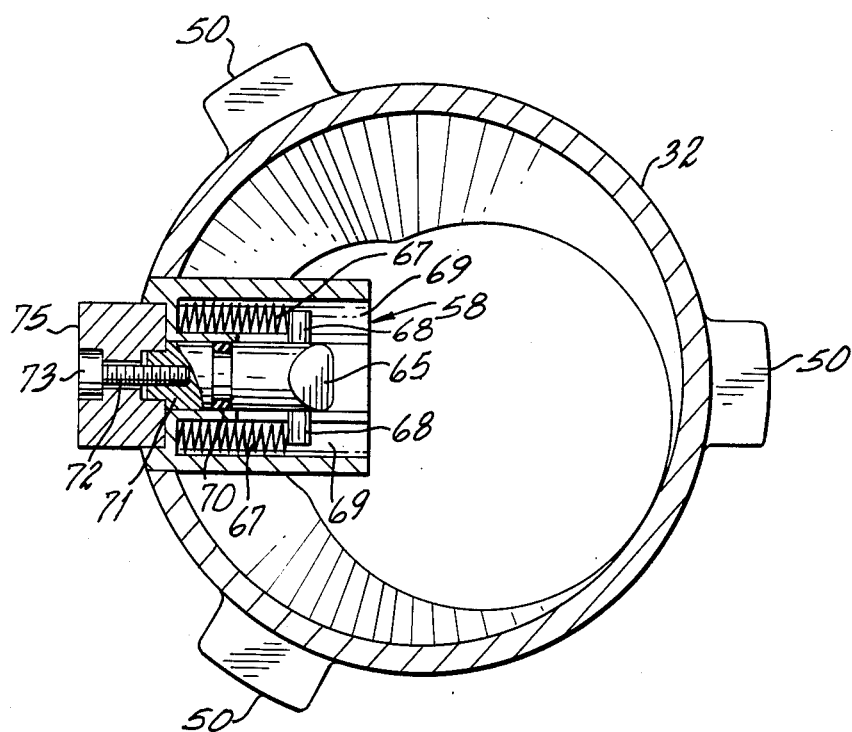
FIG. 3 is a cross-sectional view taken at right angles to the view of FIG. 2 showing the locking device in an extended position required to secure said inserted adapter to said filler spout in a preferred orientation.

This invention is intended for use with a fluid supply tank 20, having a circular lip 21 surrounding an opening and a filler spout 22, (shown in phantom in FIG. 1) that extends obliquely downward into tank 20 from said lip 21. A first interrupted ring 25 (FIG. 1) extends peripherally from the inner wall of filler spout 22 and normally receives securing means 26 in the form of lugs or the like on a closure cap 27 to insure normal coupling of closure cap 27 to filler spout 22 on rotary motion of closure cap 27. A tank 20 so provided is subject to spillage of stored fluid when closure cap 27 is not properly secured to filler spout 22. A conventional drip guard 28 is provided for closure cap 27. In FIG. 1, a securing lug 50 (to be explained later) is shown in the position normally occupied by securing means 26 of closure cap 27 prior to this invention, as will be better understood as this description progresses.

Figure 4:
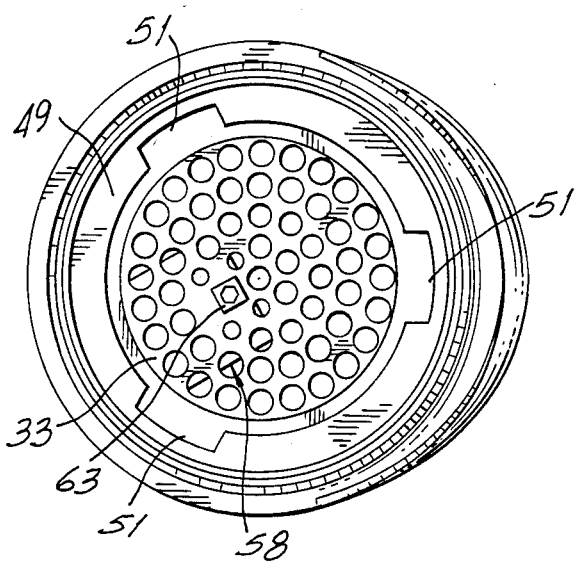
FIG. 4 is a plan view of the adapter in a tank opening with the fuel cap removed.

The present invention provides an adapter 30 constructed and arranged to be secured to filler spout 22 in the manner similar to that previously used to secure closure cap 27 directly thereto. Adapter 30 comprises an adapter pipe 32 constructed and arranged of smaller cross-section than filler spout 22 to be received within the latter. Adapter pipe 32 has a removable screen 33 (FIG. 4) and a thickened inner end portion 34 defining at its inner end an upper oblique inner valve support surface 37 of circular configuration. Surface 37 lies in a flat, oblique plane. The oblique plane of surface 37 of pipe 32 lies between about 5 and 15 degrees from vertical, and 12 degrees is preferred.

A bracket 40 is integral with thickened, inner end wall portion 34 and a flapper valve support plate 42 is pivotally secured to bracket 40. A flapper valve 44 is bonded at its upper end portion to support plate 42 such as by welding and extends therebeyond to completely cover an inner end opening for adapter pipe inner end portion 34 defined within and surrounded by oblique surface 37 of inner end portion 34. Flapper valve 44 is a one-way valve at the inner end of adapter pipe 32 that is weighted by support plate 42 to pivot downward by gravity into flat engagement against oblique surface 37 in the absence of a valve lifting force due to gravitational inward flow of fluid.

A flat circular gasket 46 of high temperature and oil resistant rubber or other rubber-like material is applied to oblique surface 37 to improve the sealing effect between flapper valve 44 and oblique surface 37 due to surface tension of a film of oil between flapper valve 44 and gasket 46. In addition, the pressure within tank 20 is greater than ambient pressure of the surrounding atmosphere. This difference in pressure further secures flapper valve 44 to gasket 46 and closes the inner end opening of adapter pipe 32. Therefore, if the adapter 30 is supported in fluid-impervious relation to the outer end of filler spout 22, the inward spacing of closed one-way flapper valve 44 from the outer end of filler spout 22 insures against leakage or spillage of fluid from tank 20. However, prior to this invention, no easy way existed to convert a tank 20 subject to leakage or spillage when closure cap 27 is not secured to filler spout 22, to a modified tank that does not require securing said closure cap to said filler spout as the main means to avoid leakage.

Figure 5:
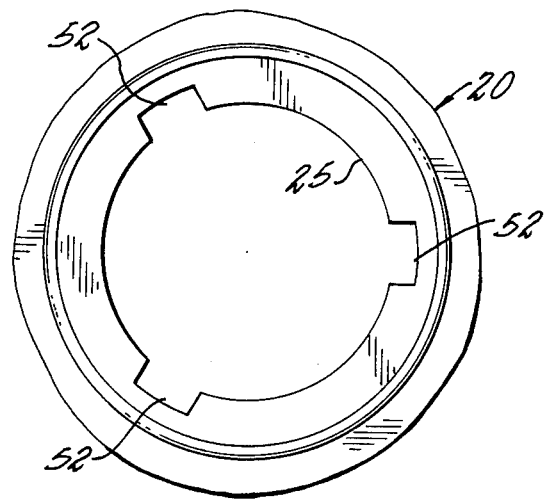
FIG. 5 is a plan view of the oil tank opening of the FIG. 1 embodiment.
Figure 6:
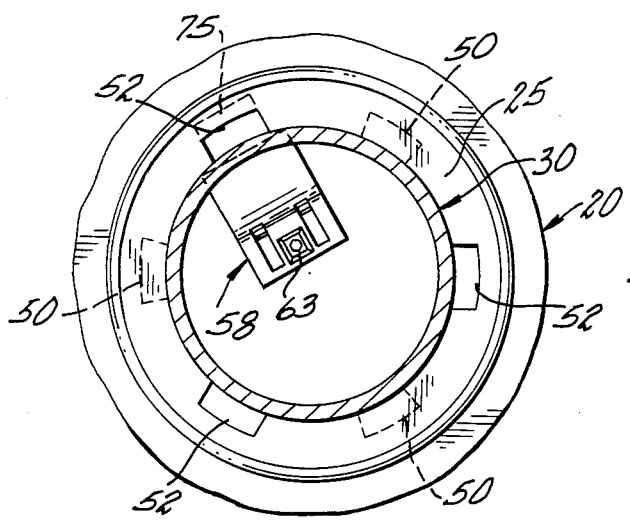
FIG. 6 is a sectional view along line 6—6 of FIG. 1 of said adapter and its locking device after inserting said adapter and reorienting said adapter into a position wherein said extension member is ready to be extended into an extended position, shown in phantom, to lock said adapter to said filler spout in a desired orientation.

According to a preferred embodiment of this invention, an enlarged collar 48 thicker than adapter pipe 32 extends axially beyond the outer end of adapter pipe 32 to provide a substitute locking and sealing means for cap 27 when adapter 30 is inserted within filler spout 22. Securing lugs 50 are arranged to extend radially outward of adapter pipe 32 every 120 degrees. Enlarged collar 48 is provided with another interrupted ring 49 (FIG. 4) having openings 51 peripherally spaced at 120 degrees spacing. Radial openings 52 in interrupted ring 25 (FIG. 5) are also spaced at 120 degrees to enable lugs 50 to be aligned simultaneously with openings 52. Securing lugs 50 are constructed and arranged to be sufficiently identical to securing lugs 26 of closure cap 27 to enable adapter 30 to readily engage the outer end of filler spout 22 in a manner similar to that of closure cap 27. More specifically, openings 51 are constructed and arranged in the interrupted ring 49 of enlarged collar 48, to be sufficiently identical to openings 52 of interrupted ring 25 of filler spout 22 as to enable ready engagement of the outer end portion of collar 48 by closure cap 27 in a manner similar to that by which lugs 26 of closure cap 27 initially engage the interrupted ring 25 of filler spout 22 prior to the addition of adapter 30. Hence, these structures enable adapter 30 to be secured to filler spout 22 instead of to closure cap 27, and closure cap 27 to be secured to the enlarged collar 48 of adapter 30 instead of to filler spout 22.

Enlarged collar 48 also limits penetration of adapter 30 into filler spout 22.

In order to insure a leak proof connection between the tank lip 21 and the inner end of enlarged collar 48, inner gasket means 54 is provided therebetween. In addition, outer gasket means 56 is provided as part of the closure cap 27 to be interposed between the outer end of enlarged collar 48 and closure cap 27 to insure absence of leakage therebetween. Inner gasket means 54 and outer gasket means 56 are preferably O-rings of rubber-like material and may be fixed to any of the aforesaid interfacial surfaces to minimize leakage.

The present invention comprises a locking device of special construction and arrangement fixed to adapter 30 to insure that adapter 30 is fixed to filler spout 22 and is provided with means preventing its rotation from an optimum angular relation to insure that flapper valve 44 drops by gravity into flatwise engagement against the thickened inner end portion 34 of adapter pipe 32 in the absence of the gravity flow of fluid into fluid storage tank 20 through the tank opening defined by lip 21. A preferred embodiment of locking device comprises an internally chambered block member 58 comprising an externally threaded bolt 63 that has a square head and an inner axially movable first cam member 64 and causes the latter to move therewith in an axial direction of said adapter pipe 32. First cam member 64 is shaped at one end to make a slideable wedging engagement against a radially inner end of a second cam member 65 of wedge shape. The latter is slideable in a main groove 66 in a radial direction in response to axial movement of first cam member 64. A pair of springs 67 abut lugs 68 at their radially inner ends along spring receiving grooves 69 that run parallel to main groove 66. The radially outer ends of springs 67 abut the radially outer ends of spring receiving grooves 69. Slots above spring receiving grooves 69 (not shown) are provided to enable extraction of block member 58 in case the latter jams.

Second cam member 65 at its radially outer end engages an O-ring 70 that, in turn, engages an internally threaded adapter member 71 that, in turn, threadedly receives a rotatable bolt 72 having an enlarged head 73. The latter is received in a socket of a radially movable extension member 75. The dimensions of the latter are constructed and arranged to fit within one of the openings 52 of interrupted ring 25. Block member 58 is fixed to the wall of adapter pipe 32 in diametrically opposed relation to but axially offset from one of said securing lugs 50. It is thus apparent that block member 58 is fixed to adapter pipe 32 to rotate with the latter while radially movable extension member 75 is retracted. When adapter pipe 32 is rotated to its desired orientation, externally threaded bolt 63 is rotated to move first cam member 64 axially outward toward main groove 66, thereby forcing second cam member 65 and its attached elements including radially movable extension member 75 in a radially outward direction until radially movable extension member 75 interfits within a preferred opening 52 to lock the adapter pipe 32 in proper orientation relative to filler spout 22. The square head of the screw 63 fits into a square slot in the screen 33 which secures it against rotation.

When adapter 30 is in its proper orientation while locked to filler spout 22, openings 52 in interrupted ring 25 are offset 15 degrees from openings 51 in interrupted ring 49 and one opening 51 is located at the lowermost point of interrupted ring 49. This arrangement facilitates pouring of fuel that is poured from a fuel supply source as well as any that collects in drip guard 28 through the opening 51 at the bottom of interrupted ring 49 for further flow through the adapter pipe 32 into tank 20.

With the structure of the preferred embodiment just described, an easy method of converting a fluid storage tank susceptible of leakage and spilling to one that prevents such leakage and spilling is readily available. Instead of removing an old type of storage tank and rebuilding a new type of storage tank onto an aircraft fuselage, all that is needed is to remove the closure cap 27 from filler spout 22 by rotary motion of lugs 26 out of alignment with openings 52 and attach adapter 30 to filler spout 22 by first aligning lugs 50 with openings 52 to move adapter 30 within filler spout 22, and then, after said insertion rotating adapter 30 by 60 degrees to align extension member 75 with a selected opening 52 and turning bolt 63 in a direction that forces extension member 75 into selected opening 52, thus locking adapter 30 to filler spout 22 with oblique support surface 37 oriented at a desired orientation and inserting removable screen 33 around bolt 63. An indicia mark (not shown) may by provided to insure that adapter 30 is oriented properly to insure that extension member 75 aligns with the proper opening 52 of the three openings 52 that are available.

Normally, once this adjustment is made, it is permanent. However, when an accident occurs to damage the storage tank 20, it may become necessary to replace or inspect the adapter 30. This replacement is readily accomplished by removing cap 27 and removable screen 33, and unscrewing externally threaded bolt 63 to lift the latter a desired distance out of its operative position within block member 58. Springs 67 bear against lugs 68 to force wedge member 65 radially inwardly to withdraw radially movable extension member 75 from its mating opening 52, thus enabling one to remove adapter 30 from within filler spout 22 by rotating collar 48 until lugs 50 are aligned with openings 52 and then lifting adapter 30 from the outer end of filler spout 22. A replacement adapter 30 is then readily inserted.

This invention makes it possible to continue using an existing fluid storage tank 20 by retrofitting an adapter 30 to a filler spout 22 in a simple operation. The thousands of oil tanks for jet aircraft that are presently in service make it desirable to have available an adapter that can be permanently installed onto an existing filler spout in the manner presently used to install a closure cap. Then, the closure cap 27 can be preferably installed onto the outer end of the adapter 30. The present invention is made possible by providing the adapter with securing means identical to those of the conventional filler cap and an enlarged collar at its outer end portion provided with cooperating securing means such as interrupted ring 49 with openings 51 constructed and arranged to mate with the securing means of the conventional closure cap.

According to the provisions of the patent statutes, the principle, preferred construction and mode of operation of this invention have been explained and what is now considered to be its best embodiment has been described and illustrated. However, it should be understood that the invention may be practiced otherwise than as specifically illustrated and described within the scope of the claimed subject matter that follows.

What is claimed is:

1. A device to prevent loss of fluid from a fluid storage tank having a filler spout extending downward into said tank due to improper closure of a closure cap for said filler spout,
   said device comprising an adapter having an adapter pipe constructed and arranged of smaller cross-section than said filler spout to be inserted within said filler spout and a one-way valve at the inner end portion of said adapter pipe,
   characterized by an enlarged collar thicker than said adapter pipe and extending axially outward therefrom, said adapter being provided with securing means sufficiently similar to securing means provided on said closure cap to secure said enlarged collar to cooperating securing means fixed to said filler spout in non-leaky relation thereto in the same manner as said closure cap would be secured directly to said filler spout in the absence of said adapter, whereby said adapter replaces said cap in retrofit relation to said tank.

2. A device as in claim 1, wherein said one way valve comprises an adapter pipe end portion having an inner end wall forming a flat support plane facing obliquely upward, and a flapper valve pivotally attached to the upper end of said inner end wall and constructed and arranged to fall by gravity to rest against said support plane.

3. A device as in claim 2, further including means fixed to or integral with said adapter to lock said adapter to said filler spout in a preferred fixed angular relation therewith so that said flat oblique support plane is oriented at a desired acute angle between 5 and 15 degrees from the vertical.

4. A device as in claim 3, wherein said lock means comprises an internally chambered block member fixed to said adapter, a first cam member movable axially of said adapter pipe, a second cam member cooperating with said first cam member to move radially outward in response to axially inward movement of said first cam member, extension means movable in concert with said second cam member, an interrupted ring fixed to said filler spout and having a radially extending opening positioned to be entered by said extension means when said adapter pipe is in proper angular orientation with respect to said filler spout.

5. A device as in claim 4, further including groove means, spring means received in said groove means, and lugs extending transversely of said groove means to be engaged by said spring means within said block member to withdraw said extension means from said radially extending opening when said first cam member is retracted axially of said adapter pipe to facilitate removal of said adapter.

6. A device as in claim 3, wherein said flat oblique support plane is oriented at an angle of about 12 degrees from vertical.

7. A device as in claim 3, further comprising an interrupted ring having a plurality of peripherally spaced openings constructed and arranged to move with said enlarged collar to have one of said spaced openings at the bottom of the periphery of said immediately previous ring to provide a flow of fluid through said bottom opening when said adapter is locked to said filler spout in said preferred fixed angular relation.

8. A device as in claim 2, further including a flat circular gasket member supported on said inner wall to improve the seal between said flapper valve and said inner wall.

9. A device as in claim 1, wherein said enlarged collar has securing means at its outer end portion constructed and arranged to interfit said securing means provided on said closure cap.

10. A method of converting a fluid storage tank having a removable closure cap provided with securing means constructed and arranged to interfit securing means provided on the outer end portion of a filler spout for said fluid storage tank, the latter being susceptible of loss of fluid when said closure cap is not properly secured to said filler spout, to a fluid storage tank protected from loss of stored fluid even when said closure cap is not properly secured to said filler spout comprising disconnecting said closure cap from said filler spout, introducing within said filler spout an adapter comprising an adapter pipe of smaller cross-section than said filler spout and having a one way valve at one end portion of said adapter pipe and an enlarged collar having securing means constructed and arranged to interfit said securing means provided on the outer end portion of said filler spout, said enlarged collar extending from the other end portion of said adapter pipe, and interfitting said securing means of said enlarged collar to said securing means of said filler spout to provide a leak-proof connection between said enlarged collar and said filler spout.

11. A method as in claim 10, further including providing the inner end of said adapter pipe with an oblique support wall, pivotally supporting said one way valve on said support wall, orienting said adapter pipe relative to said filler spout so that said one way valve is free to fall by gravity against said oblique support wall to close an inner end opening of said adapter pipe when said one way valve is not subjected to a counter gravitational force and fixing said orientation.

12. A method as in claim 10, further including providing on the outer end portion of said enlarged collar securing means constructed and arranged to interfit said securing means provided on said closure cap, and including interfitting said securing means provided on said closure cap to said securing means provided on the outer end portion of said enlarged collar to prevent entry of debris into said adapter.

* * * * *